United States Patent [19]
Aurilio et al.

[11] Patent Number: 5,884,862
[45] Date of Patent: Mar. 23, 1999

[54] AUTOMATIC RADIOSONDE BALLOON LAUNCHING MODULE

[75] Inventors: Giuseppe Aurilio, Arlington, Mass.; James Berrigan, Merrimack, N.H.

[73] Assignee: Visidyne, Inc., Burlington, Mass.

[21] Appl. No.: 691,686

[22] Filed: Aug. 2, 1996

[51] Int. Cl.[6] .................................................... B64B 1/40
[52] U.S. Cl. ........................ 244/1 TD; 244/31; 244/63; 244/98
[58] Field of Search ................................. 244/96, 98, 63, 244/31, 1 TD, 33; 116/DIG. 9; 141/313, 314, 317; 446/220, 225

[56] References Cited

U.S. PATENT DOCUMENTS

| | | |
|---|---|---|
| 4,494,714 | 1/1985 | Hill et al. ................................ 244/31 X |
| 4,564,159 | 1/1986 | Hill et al. ................................ 244/31 X |
| 4,795,112 | 1/1989 | Hashimoto ............................. 244/31 X |
| 4,911,379 | 3/1990 | Kopelman ............................. 244/98 X |
| 5,548,283 | 8/1996 | Martin ............................... 244/1 TD X |
| 5,636,480 | 6/1997 | Lauritsen et al. ...................... 244/33 X |

FOREIGN PATENT DOCUMENTS 875411   7/1971   Canada .................................... 244/98

*Primary Examiner*—William Grant
*Attorney, Agent, or Firm*—Iandiorio & Teska

[57] ABSTRACT

A module for automatically launching a radiosonde balloon having a battery powered radiosonde tethered thereto, the module including a housing for the radiosonde balloon and radiosonde; and an automatic balloon inflation and launch apparatus.

23 Claims, 11 Drawing Sheets

AUTOMATIC RADIOSONDE BALLOON LAUNCHING MODULE

FIELD OF INVENTION

This invention relates to radiosonde balloon launching and more particularly to a self-contained automatic radiosonde balloon launching module.

BACKGROUND OF INVENTION

Radiosondes are small radio transmitters which are tethered to hydrogen or helium filled balloons and launched into the upper atmosphere to collect atmospheric data and to transmit this data to a remote data collection location. Radiosondes are used to measure temperature, air pressure, wind speed, ozone levels and humidity. The National Weather Service, in conjunction with weather services all over the world, simultaneously launches radiosondes in order to form a measurement grid of the upper atmosphere. These launches typically occur twice daily at twelve-hour intervals.

Launching each radiosonde typically requires two people and can take up to two hours to complete. First, the balloon is manually inflated. The balloons can be either three-foot diameter, 300-gram balloons or six-foot diameter 600-gram balloons, depending on the weather conditions and the size of the radiosonde being launched. The balloons are formed of very thin latex and must be inflated very slowly in order to minimize the risk of rupturing. The inflation takes approximately ten to fifteen minutes at which time the buoyancy of the balloon is manually measured by the technician. Generally, a three-foot balloon must have approximately 300–400 grams of lift capacity and a six-foot balloon must have approximately 1 kg of lift capacity. Once the balloon is inflated, it is sealed and the radiosonde is tied to the balloon with approximately 60–100 feet of line.

Preparing the radiosonde for launching involves unpacking the sonde and correctly positioning the hygrometer, pressure sensor, transmitter and antenna from the sonde to ensure proper operation of each measurement element. The sonde includes a battery which is sealed and dry during shipping and must be soaked in water in order to charge the battery. Once soaked, the battery requires several minutes to charge. A technician then checks the battery voltage using a light bulb, turns the transmitter on and registers the ID code of the sonde by scanning the bar code which identifies each sonde during its flight. The technician then checks the function of each of the measuring elements, e.g., the thermometer, hygrometer, pressure sensor, to ensure that each is functioning properly.

This process is time consuming, requires a team of technicians and can be extremely hazardous and difficult to perform in remote launch sites such as on mountain ranges and in deserts.

SUMMARY OF INVENTION

It is therefore an object of this invention to provide an automatic radiosonde balloon launching module.

It is a further object of this invention to provide an automatic radiosonde balloon launching module which is completely self-contained and eliminates the need for technician involvement in the launching procedure.

It is a further object of this invention to provide an automatic radiosonde balloon launching module which allows for safe and accurately timed launching in geographically remote areas.

It is a further object of this invention to provide an automatic radiosonde balloon launching module which facilitates radiosonde balloon launchings in extreme weather conditions.

The invention results from the realization that a radiosonde balloon can be launched from a remote location in extreme weather conditions in a safe, efficient and timely manner by providing a launching module which automatically prepares and tests the radiosonde, charges and tests the sonde battery, inflates the balloon and launches the radiosonde, regardless of the weather conditions or location of the launch site.

This invention features a module for automatically launching a radiosonde balloon having a battery powered radiosonde tethered thereto. The module includes means for housing the weather balloon and the radiosonde, and means for automatically inflating and launching the radiosonde balloon.

In preferred embodiment the module may include means for filling the battery with a battery charging fluid. There may be means for indicating that the battery is fully charged, means for regulating the temperature within the module, or means for introducing a purge gas to the module to prevent the radiosonde balloon from deteriorating. The purge gas may be nitrogen.

The module may also include means for monitoring the rate of inflation of the radiosonde balloon. There may be a balloon release valve which simultaneously closes and releases the balloon when engaged.

The module may further include hatch means having a spring-loaded hinge and a latch and a hatch release mechanism and a balloon release mechanism which engages the balloon release valve, thereby releasing the balloon. The indicating means may include a light source powered by the battery and a photoelectric element which, in response to detecting the light, outputs a signal which indicates that the battery is fully charged.

The invention also features a module for automatically launching a radiosonde balloon, including means for housing the radiosonde balloon, a battery powered radiosonde, a battery water supply and means for supplying the water to the battery, and means for programming the module to automatically inflate and launch the weather balloon at a predetermined time.

In a preferred embodiment the module may include means for indicating that the battery is fully charged. There may also be included means for regulating the temperature within the module. The module may further include means for introducing a purge gas into the module to prevent the radiosonde balloon from deteriorating. The purge gas may be nitrogen. The module may further include means for monitoring the inflation rate of the radiosonde balloon. There may be a balloon release valve which simultaneously closes and releases the balloon when engaged.

The module may further include hatch means having a spring-loaded hinge and a latch and a hatch and balloon release mechanism which initially engages a hole in the latch and, after releasing the hatch, engages the balloon release valve after the balloon is inflated, thereby releasing the balloon. The indicating means may include a light source powered by the battery and a photoelectric element which, in response to detecting the light, outputs a signal which indicates that the battery is fully charged.

The invention also features a method for launching a radiosonde balloon having a battery powered radiosonde tethered thereto, including the steps of providing a module for housing the balloon, the radiosonde, a battery water supply and means for supplying the water to the battery, and programming the module to automatically inflate and launch the balloon at a predetermined time. The method may also include providing means for indicating that the battery is fully charged. The method may further include regulating the temperature within the module, introducing a purge gas into the module to prevent the radiosonde balloon from deteriorating, and monitoring the inflation rate of the radiosonde balloon.

DISCLOSURE OF PREFERRED EMBODIMENT

Other objects, features and advantages will occur to those skilled in the art from the following description of a preferred embodiment and the accompanying drawings, in which.

Figure 1B:
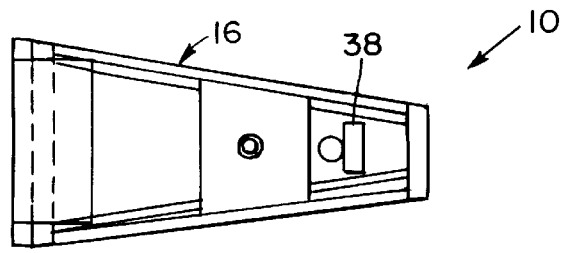
FIGS. 1A and 1B are schematic diagrams of a side view and top view, respectively, of the radiosonde balloon launching module of the present invention.
Figure 1A:
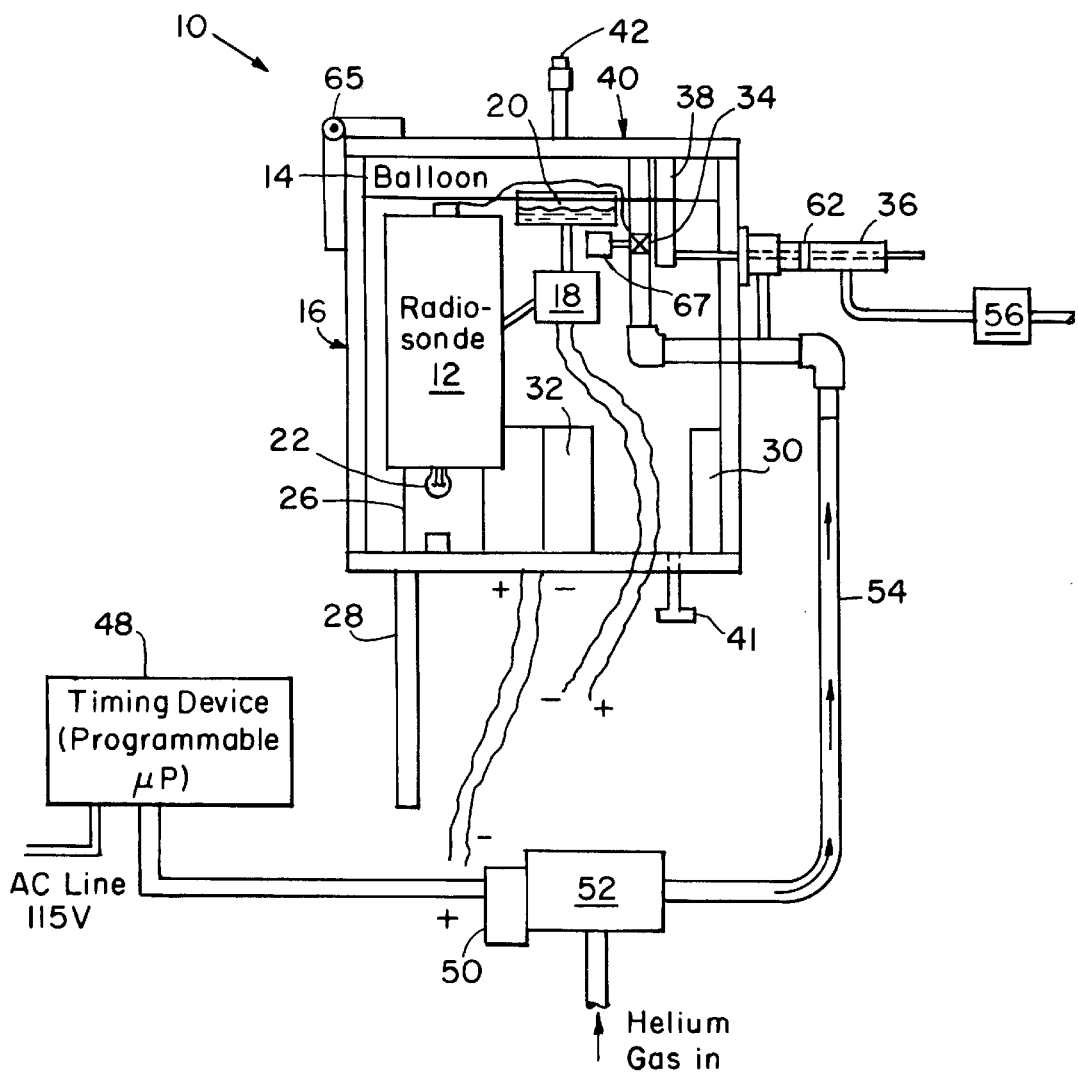
Figure 3:
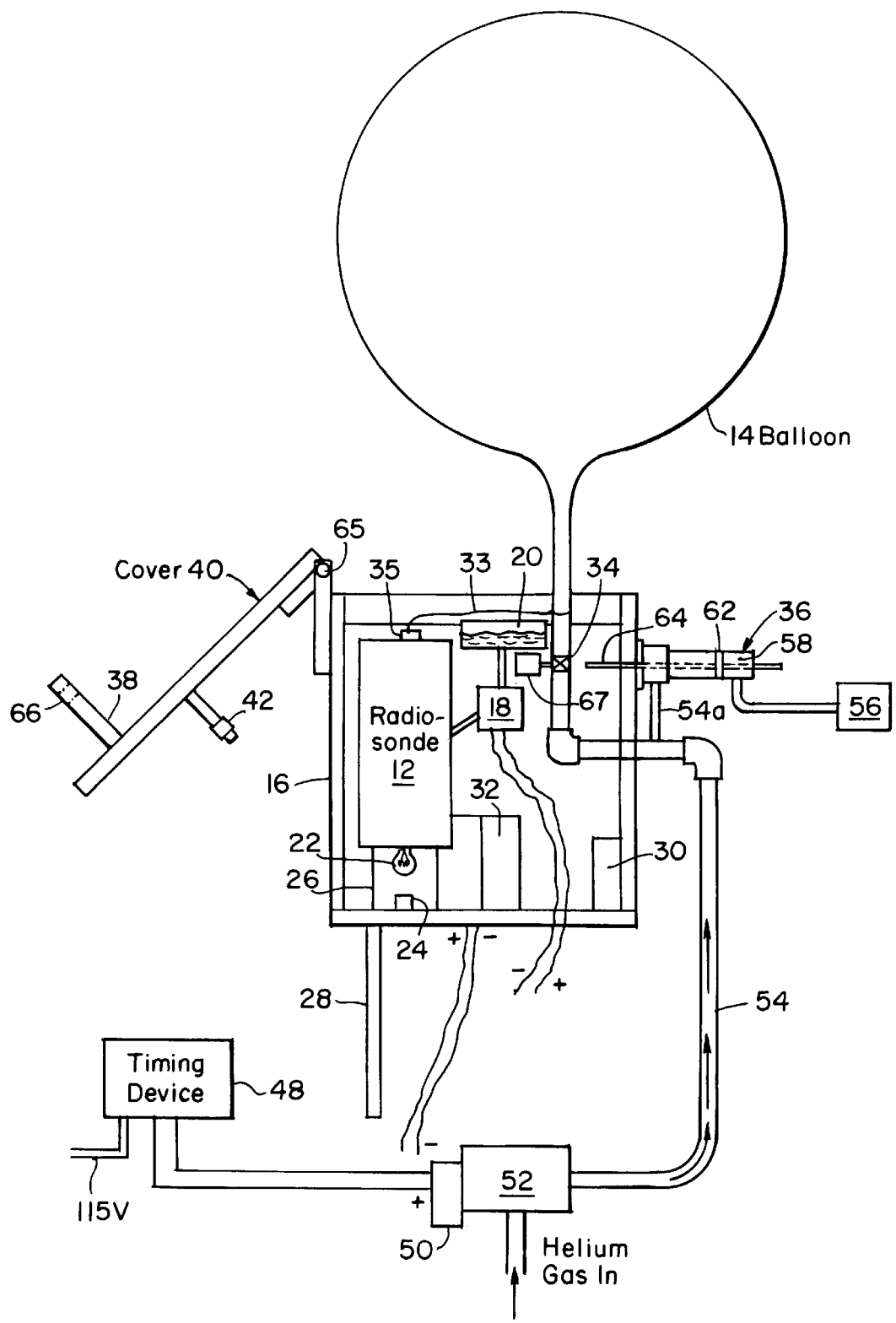
FIG. 3 is a schematic diagram showing the module of the present invention during the inflation of the radiosonde balloon.
Figure 13:
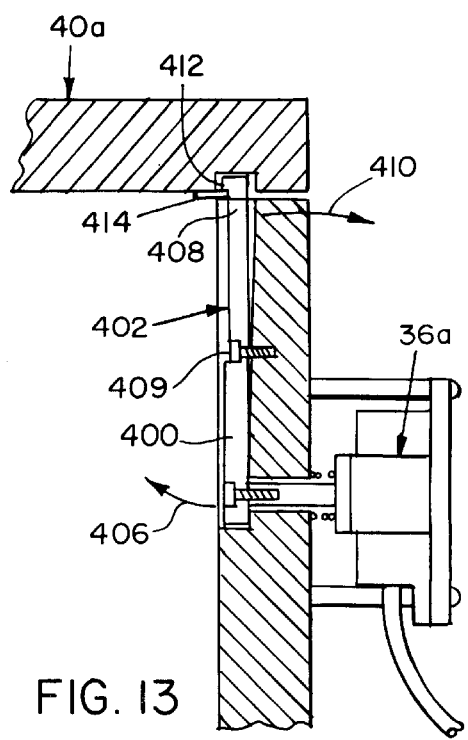
Figure 12B:
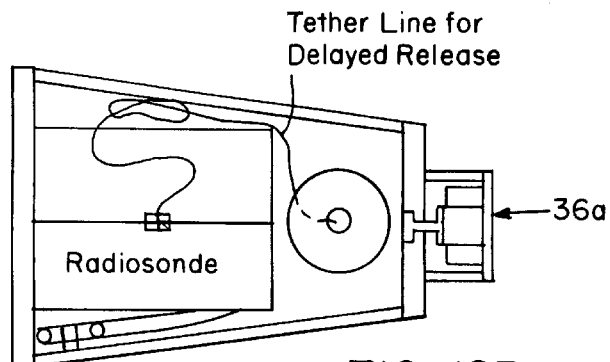
Figure 12A:
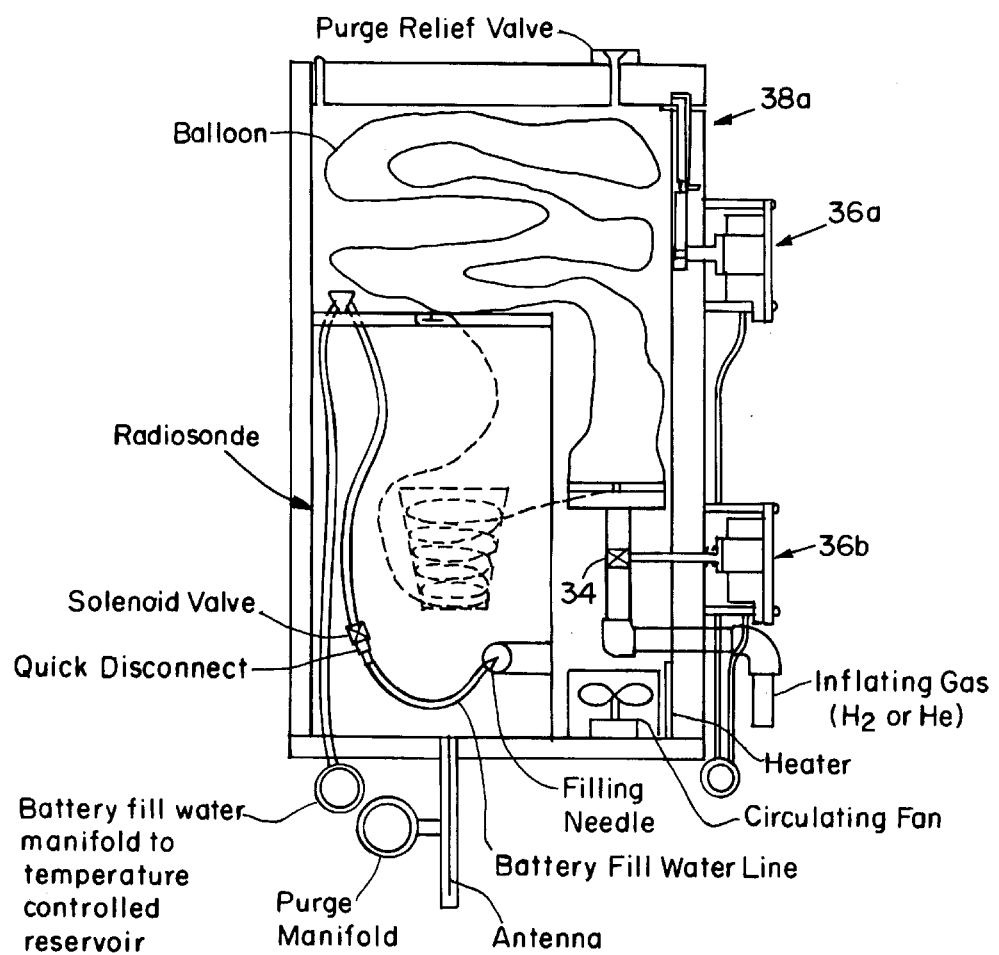
Figure 14:
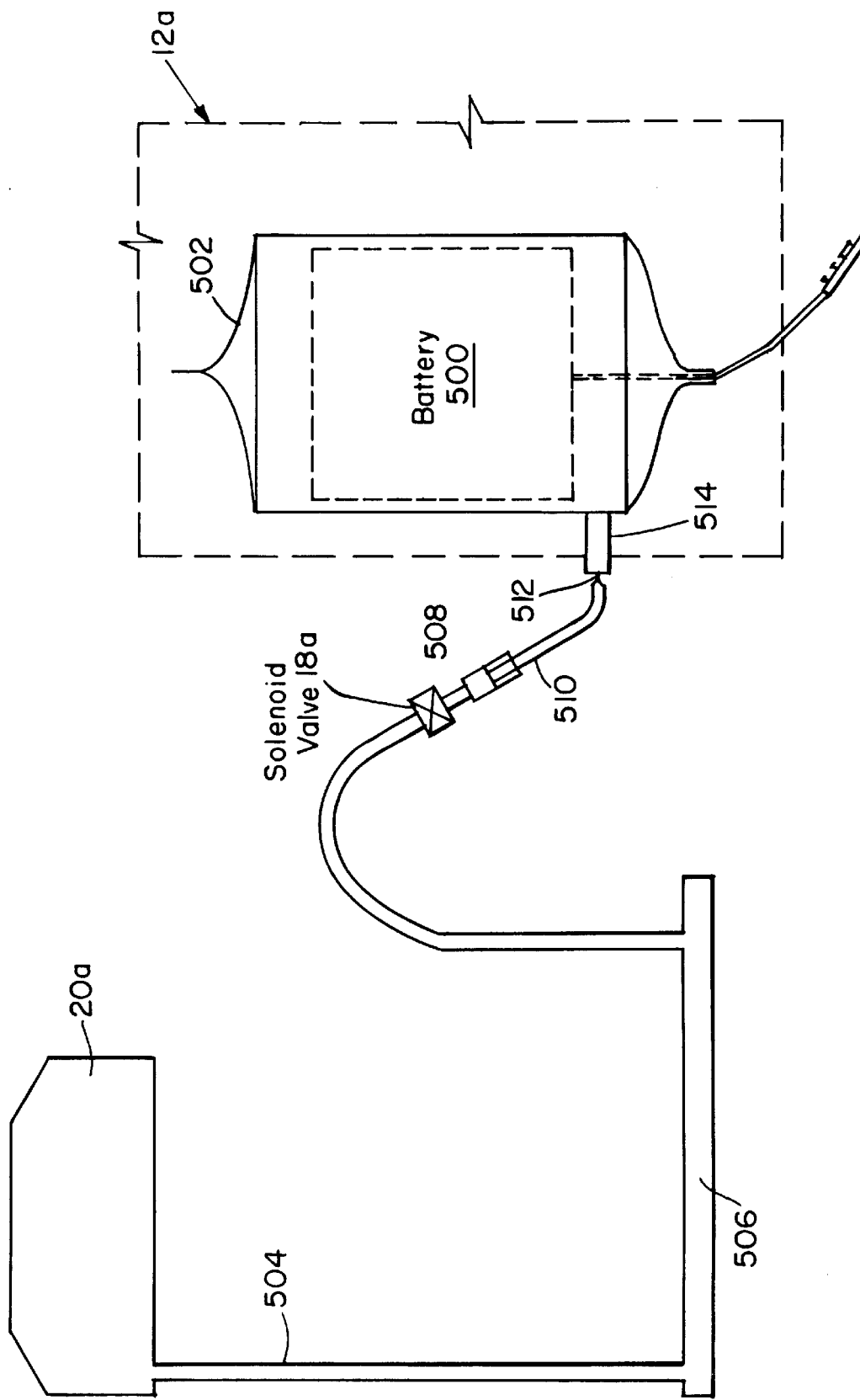

FIGS. 12A and B are schematic diagrams of a side view and top view, respectively, of another embodiment of the radiosonde balloon launch module of the invention, similar to that of FIGS. 1A and B with modified balloon and latch release mechanisms;

FIG. 13 is a detailed view of the cover hatch latch mechanism of FIGS. 12A and B; and FIG. 14 is an alternative battery filling apparatus similar to that shown in FIG. 3.

In FIGS. 1A and 1B there is shown a side view and top view, respectively, of radiosonde balloon launching module 10 of the present invention. In FIG. 1A, radiosonde 12 and balloon 14 are stored within hermetically sealed radiosonde balloon launching module 16. Battery water control valve 18 operates to inject water from battery water supply 20 into the cells of the battery of radiosonde 12 when launch preparation begins. Radiosonde 12 includes light bulb 22 connected to its battery. When the battery is fully charged, bulb 22 receives power from the battery and illuminates, causing photoelectric element 24 to sense the illumination and thus confirm that the battery is fully charged. Radiosonde 12 also includes antenna 26 for transmitting collected data back to a weather station. Radiosonde balloon launching module 16 includes antenna tube 28 for housing antenna 26 before launch, an electric heater and thermostat 30 and fan 32 for providing temperature regulation inside module 16. This is especially important when the module is used in cold weather climates to prevent water supply 20 from freezing. Module 16 also includes balloon release valve 34 over which the neck of balloon 14 is fastened and hatch cover/balloon release mechanism 36 which extends through latch 38 which locks hatch cover 40 closed to balloon release valve 34. Module 16 is initially injected with nitrogen through nitrogen port 41 in order to purge oxygen, which can degrade the balloon, from the module. Purge vent valve 42 allows the purged air to escape.

Microprocessor 48 controls the timing of all operations within the module 16 including hydrogen or helium gas valve control 50 which opens hydrogen or helium gas valve 52 allowing the gas to flow through pipe 54 to balloon release valve 34. Balloon release valve 34 and hatch cover/balloon release mechanism 36 are described in greater detail below with reference to FIGS. 2A and 2B.

Figure 2A:
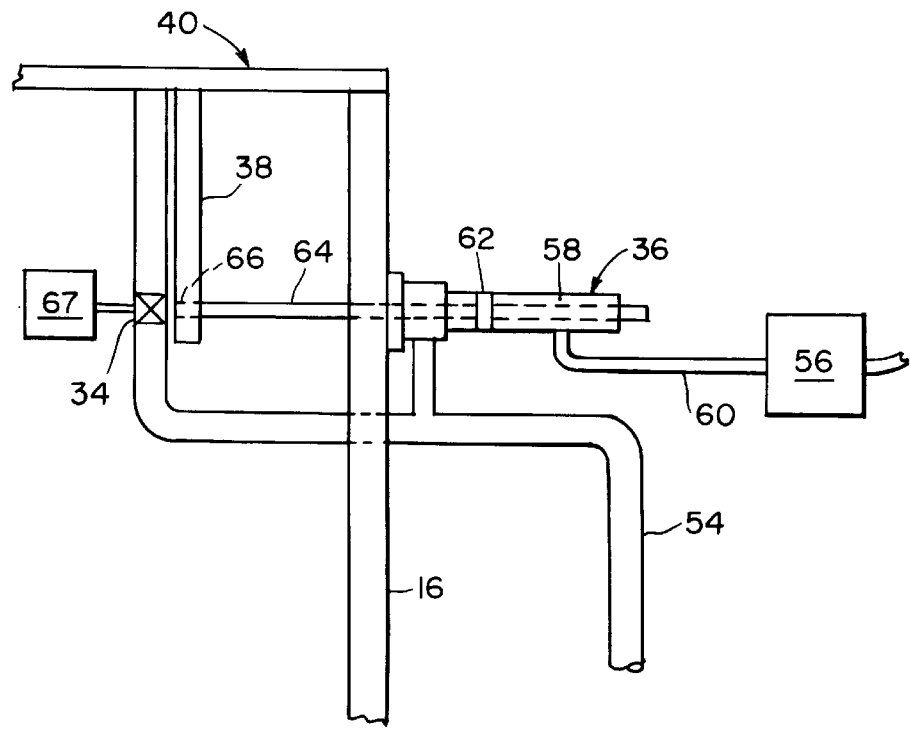
FIGS. 2A and 2B are schematic diagrams of the operation of the balloon release valve and hatch cover/balloon release mechanism of the module of FIG. 1.
Figure 2B:
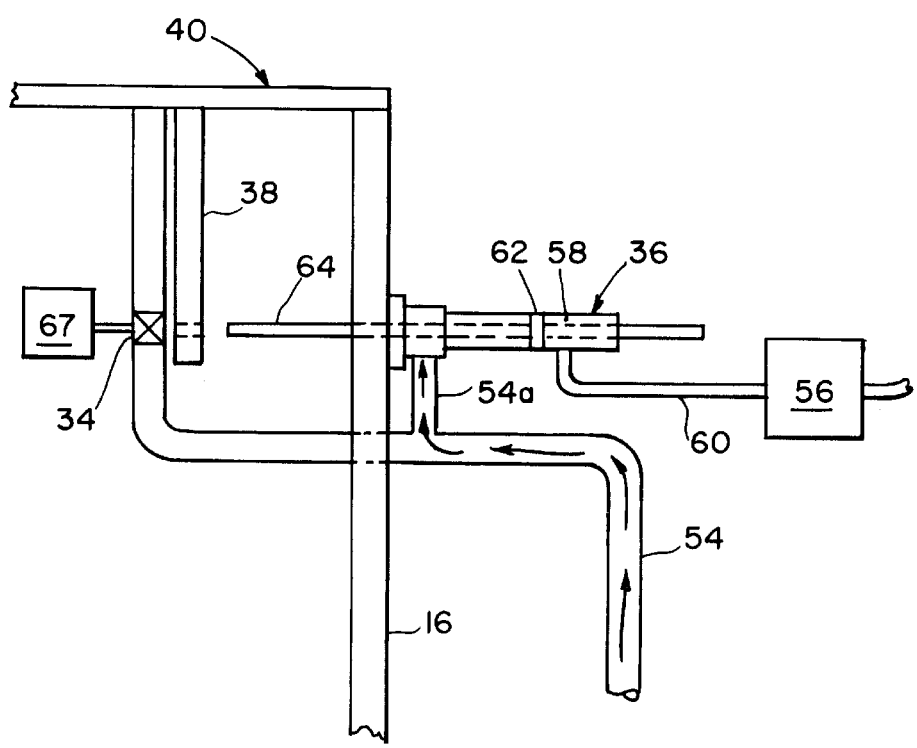

In FIG. 2A there is shown a close-up view of the balloon release valve 34 and hatch cover/balloon release mechanism 36. Module 16 is initially set up such that rod 64 of hatch cover/balloon release mechanism 36 is inserted through hole 66 without contacting balloon release valve 34. When the launch sequence is initiated, FIG. 2B, hydrogen or helium flows through pipe 54, to pipe 54a into air cylinder 58, driving plunger 62 from cover latch 38 and rod 64 out of hole 66 to release hatch cover latch 38. This allows balloon 14 to inflate once hatch cover 40, aided by spring-loaded hinge 65, FIG. 1A, opens, allowing balloon 14 to inflate to its full size.

FIG. 3 shows module 16 during the inflation of balloon 14. The flow of hydrogen or helium into the balloon is monitored by flowmeter 67 which indicates to microprocessor 48 when balloon 14 is adequately inflated, causing microprocessor 48 to instruct the gas valve control 50 to close hydrogen or helium gas valve 52 and to open compressor valve 56. Compressed air is then supplied to air cylinder 58, causing plunger 62 to drive rod 64 against release valve 34, releasing balloon 14. Balloon 14 then begins its ascent, causing tether 33 to unravel from spool 35 which is attached to the top of radiosonde 12. Once tether 33 is completely unraveled, radiosonde 12 is lifted out of module 16 and ascends along with balloon 14 into the atmosphere while collecting data and transmitting the data via antenna 26 to a ground based weather station.

Figure 4:
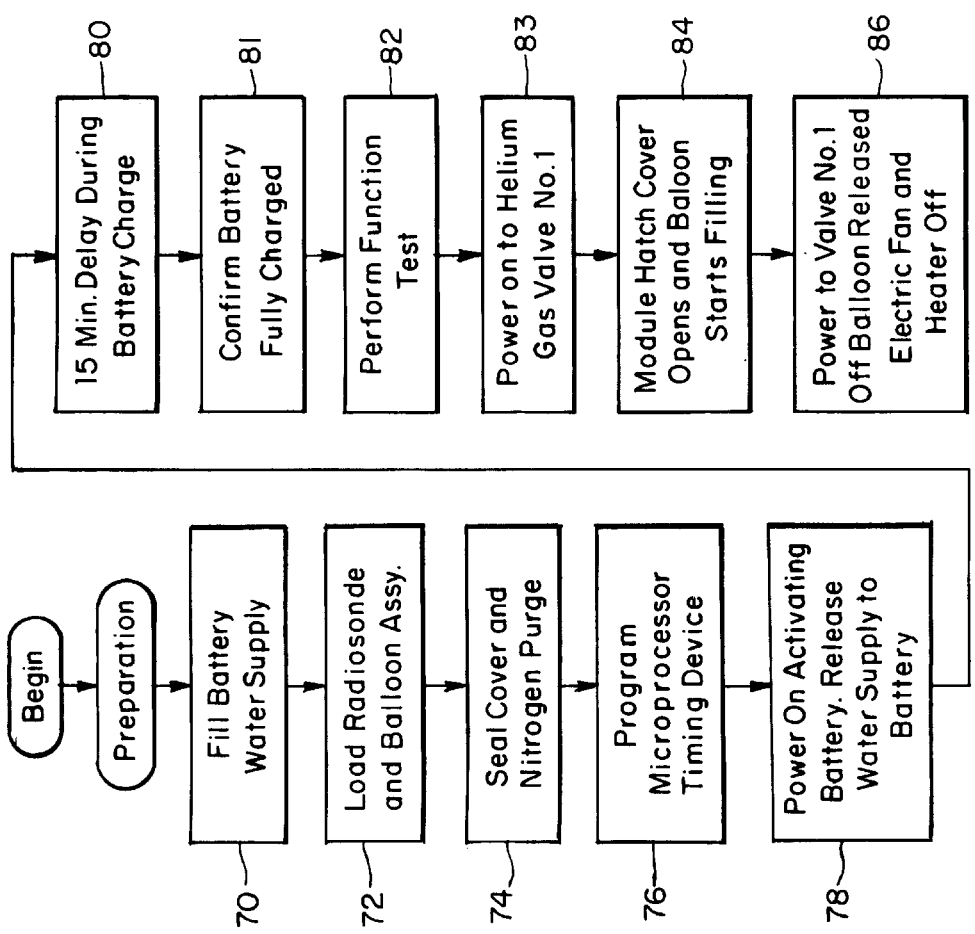
FIG. 4 is a flow chart showing the radiosonde balloon launch procedure.

FIG. 4 shows a flow chart of the procedure involved in the launching of balloon 14 and radiosonde 12. In step 70, the battery water supply is filled. In step 72, radiosonde 12 and balloon 14 are loaded into module 16 which is then sealed and purged with nitrogen, step 74. In step 76, microprocessor 48 is programmed to initiate the launch at a predetermined time, and in step 78, battery release water supply 18 is activated to inject water into the battery of radiosonde 12. After a fifteen-minute delay during which the battery is charging, step 80, light 22 illuminates, causing photoelectric element 24 to confirm that the battery is fully charged, step 81. In step 82, the radiosonde performs a functional self-test and any irregularities in the operation of radiosonde 12 or its battery are transmitted to the weather station. Power is supplied to hydrogen or helium gas valve control 50, step 83, module hatch cover 40 is opened and balloon 14 is inflated with helium through helium gas valve 52, step 84. In step 86, once flowmeter 67 determines that balloon 14 is adequately inflated, the gas valve control 50 is deactivated and compressor valve 56 is activated to supply compressed air to cylinder 58 causing rod 64 to engage balloon release valve 34 thereby releasing balloon 14. Electric fan 32 and heater 30 are then turned off as they are no longer necessary.

Figure 5:
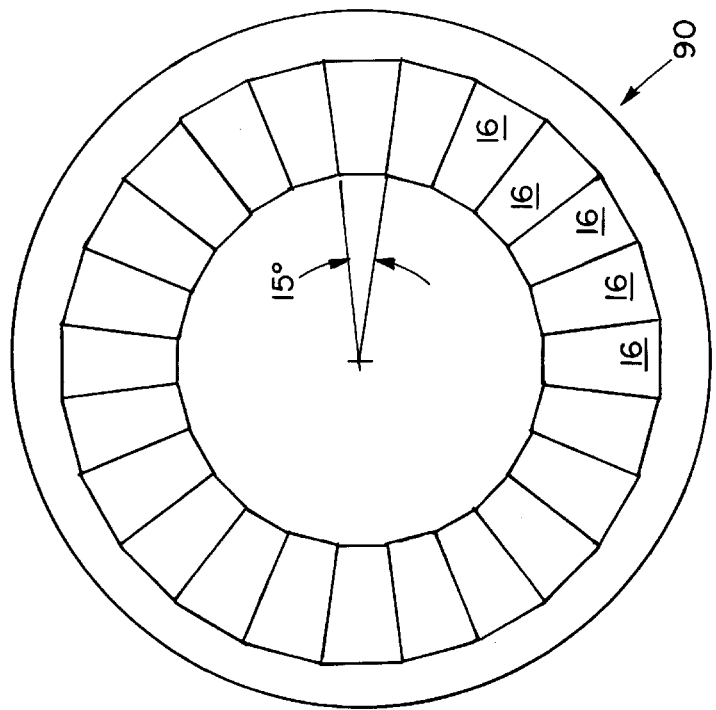
FIG. 5 is a schematic diagram of a circular array of modules of the present invention.
Figure 6:
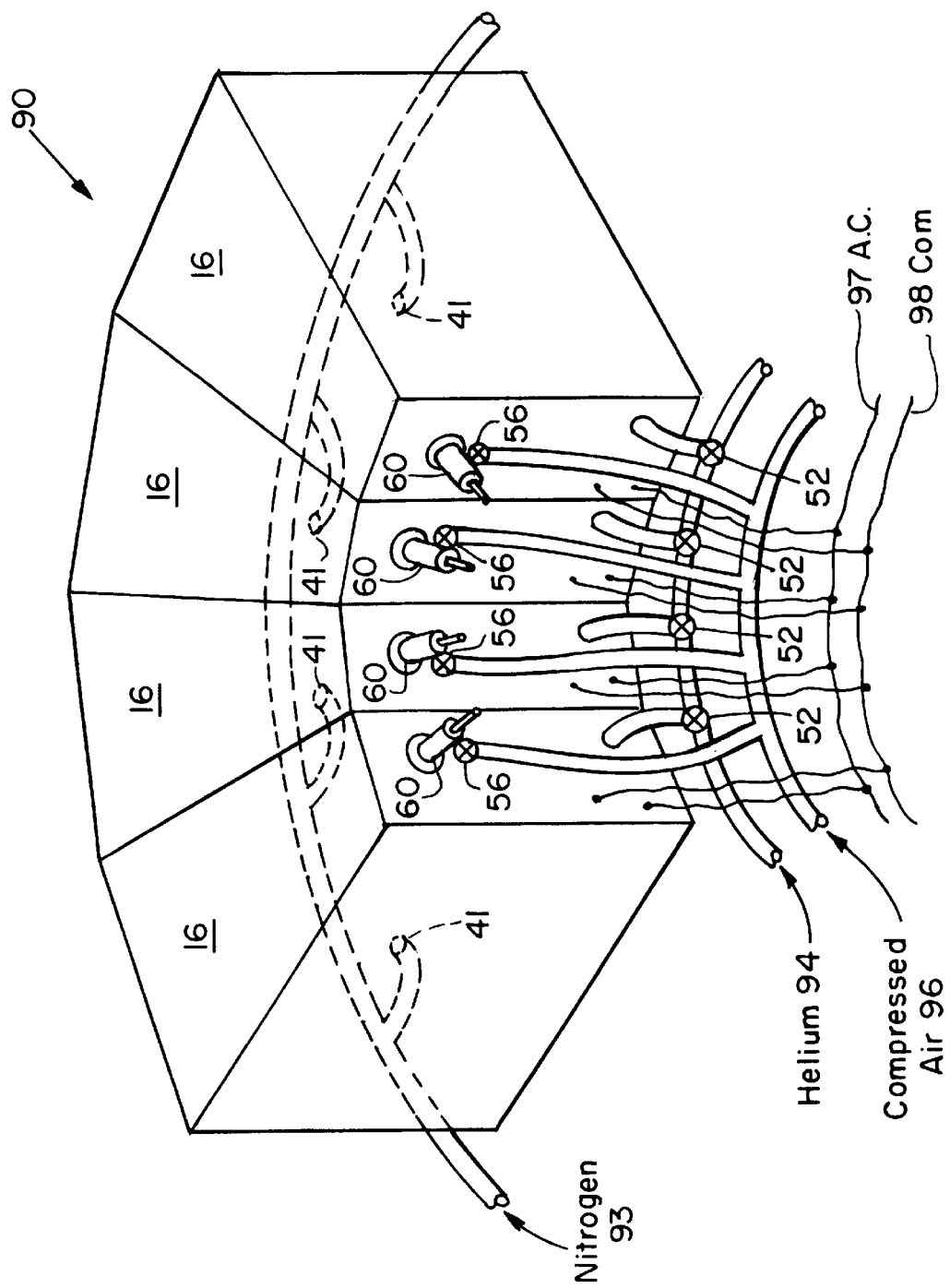
FIG. 6 is a schematic diagram showing the common connections of each of the modules of the circular array of FIG. 5.

In a preferred embodiment, a plurality of modules 16 are arranged in a circular array such as that shown in FIG. 5. FIG. 6 shows how the modules 16 of circular array 90 are connected to the hydrogen or helium tanks, nitrogen tanks, air compressor, A.C. power and the microprocessor 48. Nitrogen is supplied to each module's nitrogen port 41 through line 93, hydrogen or helium is supplied to each module's gas valve 52 through line 94 and compressed air is supplied to each module's compressor valve 56 through line 96. Power is supplied to each module via A.C. line 97 and communications with microprocessor 48 are carried out over line 98.

Figure 7:
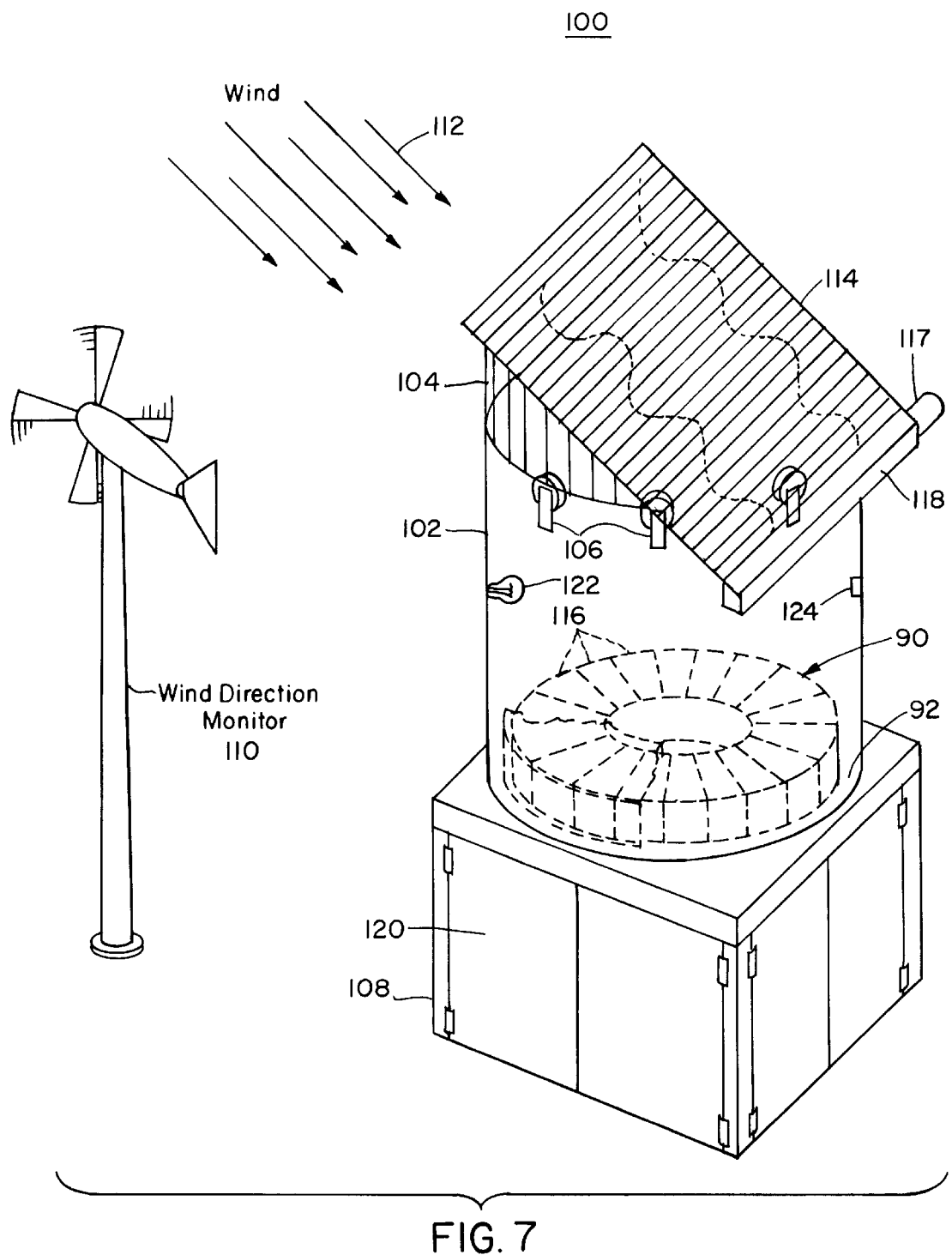
FIG. 7 is a schematic diagram of an automatic module launching system of the present invention.

Circular array 90 is loaded into radiosonde module launching system 100 as shown in FIG. 7. Launching system 100 includes fixed cylindrical silo 102, which is approximately 72 inches in diameter and 72 inches in height, for protecting the balloon from adverse weather conditions as it is inflating. Base 108, approximately six feet in height, width and depth, houses microprocessor 48, hydrogen or helium tanks, nitrogen tanks, an air compressor and power supplies necessary for the radiosonde balloon launching process.

Rotatable section 104 is wedge-shaped and includes retractable silo cover 114. In response to wind direction signals from wind direction monitor 110, section 104 rotates to position the highest side of section 104 toward the direction of the wind as shown by arrows 112. This provides greater protection for balloon 14 against the wind when it is launched. Section 104 rotates by means of a plurality of drive mechanisms 106 which are mounted at the top of silo 102. Drive mechanism 106 is described in greater detail below with reference to FIG. 8.

Retractable silo cover 114 includes drive 117 which retracts cover 114 into housing 118 when balloon 14 is ready to be launched. Base 108 is designed such that a technician can enter the base through service door 120 to service launching system 100 including replacing modules 16 of circular array 90, refilling the hydrogen or helium and nitrogen tanks, etc. Access to modules 16 is provided through the center of circular array 90 which is approximately 39 inches in diameter. Silo 102 also includes light source 122 and photoelectric element 124. These are used to ensure that balloon 14 has properly inflated prior to the launch. When balloon 14 is properly inflated, the balloon will block light source 122 from photoelectric element 124. If balloon 14 bursts during inflation or is otherwise improperly inflated or defective, photoelectric element 124 detects light source 122 and outputs a signal to the weather station indicating that balloon 14 is not properly inflated. The launch of that particular radiosonde balloon can be aborted and the launch preparation sequence is initiated with an adjacent module. Silo cover 114 may also include an ice control heater to reduce the possibility of silo cover 114 freezing and being unable to be retracted when the launching system is used in cold climates.

Figure 8:
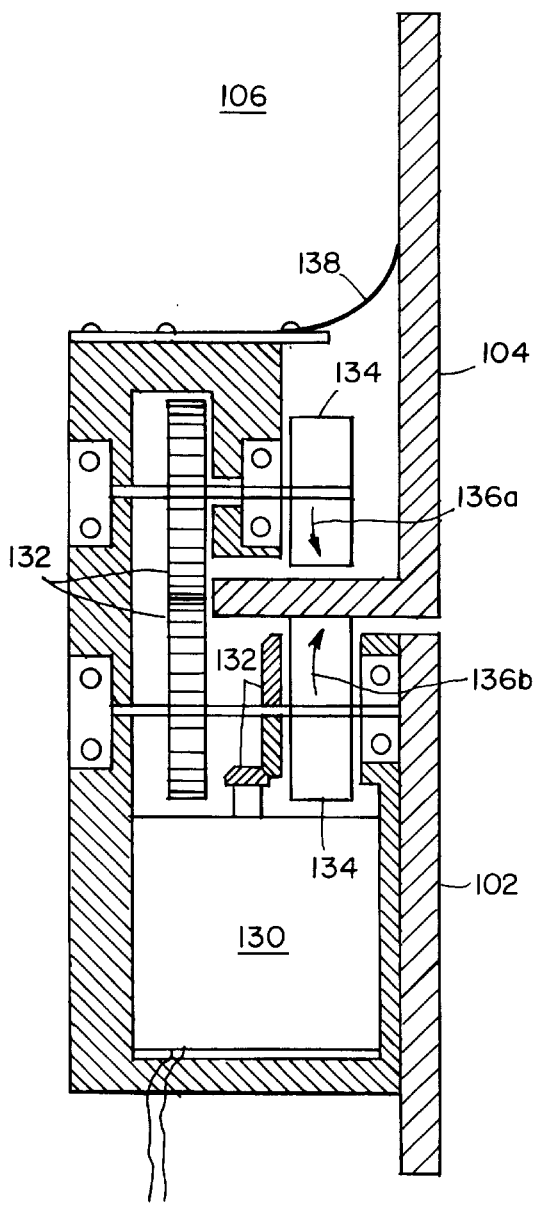
FIG. 8 is a schematic diagram of the rotatable section drive mechanism of the present invention.

Drive mechanism 106 is shown in greater detail in FIG. 8. Drive mechanism 106 is attached to silo 102 and includes motor gear box 130 which drives gears 132 which in turn rotate rubber wheels 134 in the direction of arrows 136a and 136b to drive rotatable section 104 to the desired position.

Two rubber wheels are used to ensure that, regardless of wind conditions, at least one wheel is contacting rotatable section 104 at all times. Drive mechanism 106 also includes flexible shield 138 which blocks any snow or other debris from entering into the drive mechanism.

Figure 9:
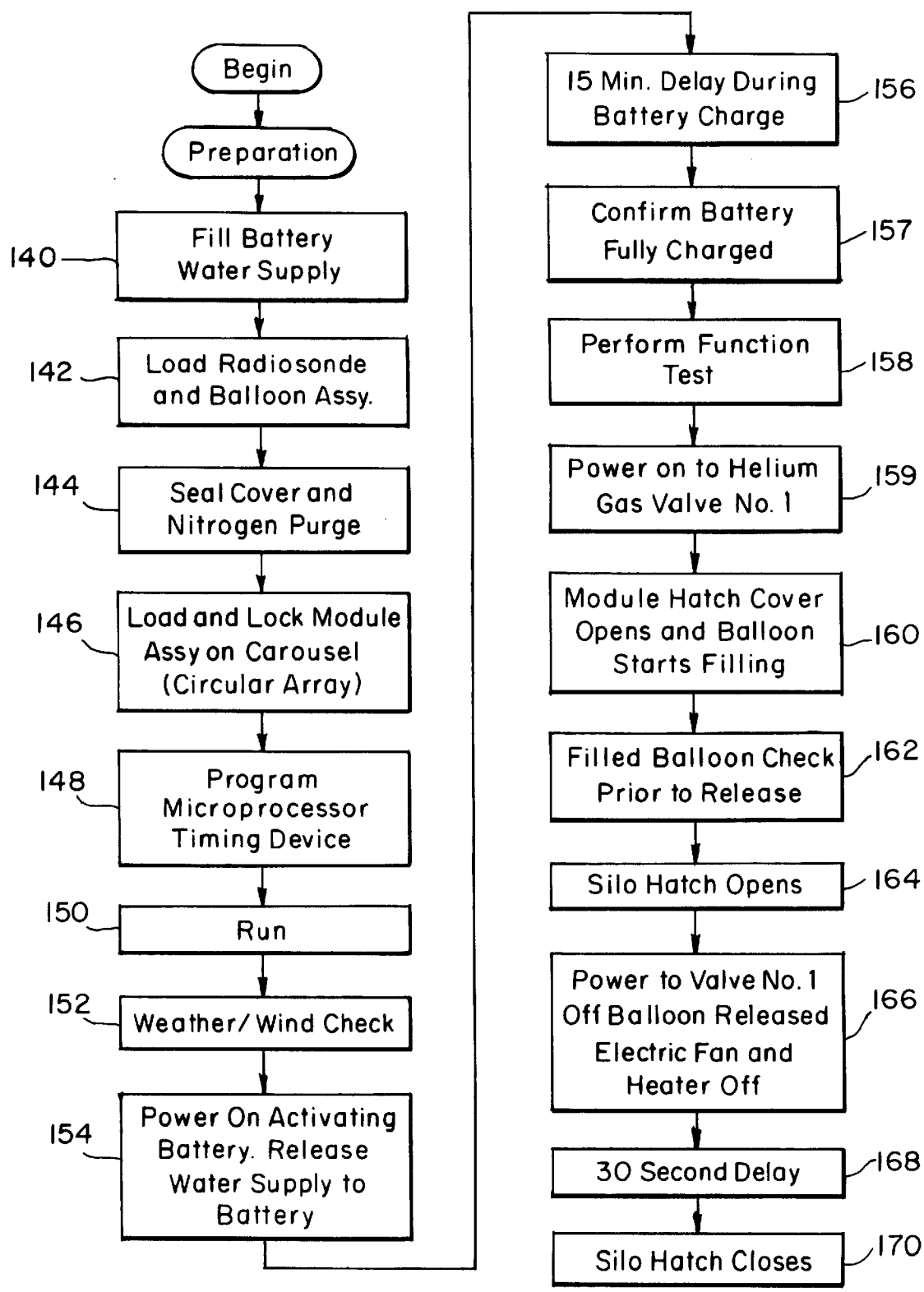
FIG. 9 is a flow chart showing the launch procedure of the automatic radiosonde balloon launching system of the present invention.

The operation of launching system 100 is shown in the flow chart of FIG. 9. Preparation begins in step 140 by filling the battery water supply in each of the modules 16. The radiosonde and balloon assemblies are loaded into each module, step 142. The modules are sealed and nitrogen purged, step 144, assigned an ID code and loaded into circular array 90 and attached as shown in FIG. 5 within silo 102, FIG. 7, step 146. Microprocessor 48 is then programmed, step 148, and run, step 150. Wind speed and direction are determined by wind direction monitor 110, FIG. 7, in step 152 and rotatable section 104 is positioned accordingly. In step 154, battery water control valve 18 is activated, supplying water from battery water supply 20 to the battery within radiosonde 12. After a fifteen-minute delay during which the battery is charging, step 156, light 22, FIG. 1, illuminates causing photoelectric element 24, FIG. 1A, to confirm that the battery is fully charged, step 157. In step 158, the radiosonde performs a functional self-test. Any irregularities in the operation of radiosonde 12 or its battery are transmitted to the control station. If there are any problems with radiosonde 12, the control station personnel can abort the launch of this particular module and continue the launch process with the next module in circular array 90. After this test, hydrogen or helium gas valve control 50, FIG. 1A, is powered on, step 158, module hatch cover 40 opens and balloon 14 begins to inflate, step 160. In step 162, balloon 14 is checked using light source 122 and photoelectric element 124 to ensure that it is properly inflated and the silo cover 114 retracts into housing 118, step 164. In step 166, the balloon is released by balloon release mechanism 36 and after a thirty-second delay, step 168, silo cover 114 closes, step 170. This process is repeated for each radiosonde balloon launching which is programmed into microprocessor 48.

Figure 11:
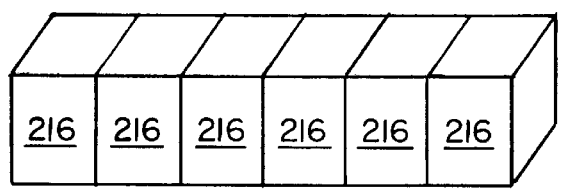
FIG. 11 is a schematic diagram of the linear array of modules used in accordance with the embodiment of FIG. 10.
Figure 10:
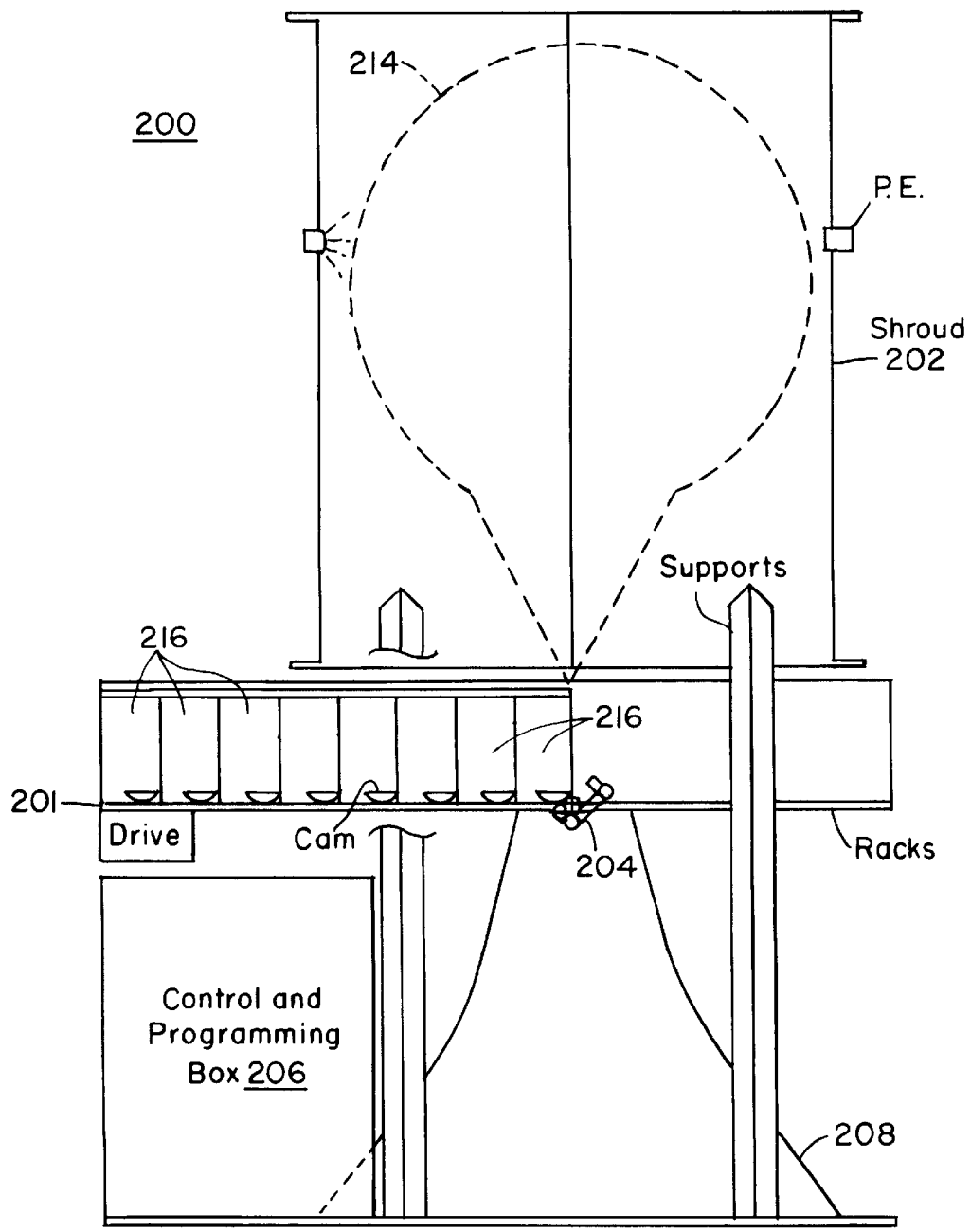
FIG. 10 is a schematic diagram of an automatic radiosonde balloon launching system which utilizes a linear array of modules according to the present invention.

Another embodiment of the present invention is shown in FIG. 10. In this embodiment, modules 216 are arranged in a linear array as shown in FIG. 11, and are loaded on track 201 of radiosonde launching system 200. Each module 216 is shifted toward balloon filling and release mechanism 204 to begin each launch procedure. Control and programming box 206 houses microprocessor 48, compressor 56, FIG. 1A, as well as the hydrogen or helium, nitrogen and compressed air tanks and power supply necessary for the launch. Radiosonde launching system 200 also includes wind deflector 208 which is conical in shape and directs wind up into silo 202 to provide additional lift to balloon 214 when it is launched.

In an alternative embodiment, FIGS. 12A and B, the hatch cover/balloon release mechanism 36 is replaced by separate hatch cover release pneumatic actuator 36a and balloon release pneumatic actuator 36b which operate hatch cover latch 38a and balloon valve 34. Pneumatic actuator 36a, FIG. 13, drives lower end 400 of lever 402 pivoted at 404 outwardly, arrow 406, and upper end 408 inwardly, arrow 410, whereby lip 412 moves to the right, away from tab 414 releasing cover 400 to flip up and open under spring bias.

Another battery water supply approach is shown in FIG. 14 where battery 500 in radiosonde 12a is enclosed in a heat sealed plastic wrap 502 and evacuated beforehand. The reservoir 20a is mounted high on top of the silo for example, to provide a gravity feed through down pipe 504, manifold 506, solenoid valve 18a, quick disconnect fitting 508 and conduit 510 to needle 512 which is installed in self-sealing button 514, made by Abbott Laboratories, Inc. When radiosonde 12a is launched button 514 draws away from needle 512, with the rising radiosonde 12a leaving needle 512 behind while button 514 seals itself.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A module for automatically launching a radiosonde balloon having a radiosonde tethered thereto, said radiosonde being powered by a battery, the module comprising:
 a module for housing an uninflated radiosonde balloon and said radiosonde
 means for automatically inflating, outside of said module for housing, said uninflated radiosonde balloon and launching said radiosonde balloon; and
 means for monitoring the rate of inflation of said radiosonde balloon, where said means for monitoring includes a flow meter interfaced with a microprocessor.

2. A module for automatically launching a radiosonde weather balloon, comprising:
 a module for housing an uninflated radiosonde weather balloon, a radiosonde powered by a battery, a battery water supply and means for supplying said water to said battery; and
 means for programming said module for housing to automatically inflate, outside of said module for housing, said weather balloon and launch said weather balloon at a predetermined time.

3. The module of claim 2 further including means for indicating that said battery is fully charged.

4. The module of claim 3 wherein said indicating means includes a light source powered by said battery and a photoelectric element which, in response to detecting light from said tight source, outputs a signal which indicates that said battery is fully charged.

5. The module of claim 2 further including means for regulating the temperature within said module.

6. The module of claim 2 further including means for introducing a purge gas into said module to prevent said radiosonde balloon from deteriorating.

7. The module of claim 6 wherein said purge gas is nitrogen.

8. The module of claim 2 further including means for monitoring the inflation rate of said radiosonde balloon.

9. The module of claim 2 further including a balloon release valve which simultaneously closes and releases said balloon when engaged.

10. The module of claim 9 further including hatch means having a spring-loaded hinge and a latch; a hatch release mechanism; and balloon release mechanism which engages said balloon release valve after said balloon is inflated, thereby releasing said balloon.

11. A method for launching a radiosonde balloon having a radiosonde tethered thereto, said radiosonde being powered by a battery, including the steps of:
 providing a module for housing an uninflated radiosonde balloon, said radiosonde, a battery water supply and means for supplying said water to said battery; and
 programming said module to automatically inflate, outside of said module for housing, said uninflated radiosonde balloon and launch said balloon at a predetermined time.

12. The method of claim 11 further including providing means for indicating that said battery is fully charged.

13. The method of claim 11 further including regulating the temperature within said module.

14. The method of claim 11 further including introducing a purge gas into said module to prevent said radiosonde balloon from deteriorating.

15. The method of claim 14 wherein said purge gas is nitrogen.

16. The method of claim 11 further including monitoring the inflation rate of said radiosonde balloon.

17. A module for automatically launching a radiosonde balloon having a radiosonde tethered thereto, said radiosonde being powered by a battery, the module comprising:
 a module for housing an uninflated radiosonde balloon and said radiosonde;
 means for automatically inflating, outside of said module for housing, said uninflated radiosonde balloon and launching said radiosonde balloon; and
 means for filling said battery with a battery charging fluid.

18. The module of claim 17, further including means for indicating that said battery is fully charged.

19. The module of claim 18 wherein said indicating means includes a light source powered by said battery and a photoelectric element which, in response to detecting light from said light source, outputs a signal which indicates that said battery is fully charged.

20. The module of claim 17, further including means for regulating the temperature within said module.

21. The module of claim 17 further including means for introducing a purge gas to said module to prevent said radiosonde balloon from deteriorating.

22. The module of claim 21 wherein said purge gas is nitrogen.

23. The module of claim 17 further including a balloon release valve which simultaneously closes and releases said balloon when engaged; hatch means having a spring-loaded hinge and a latch; a hatch release mechanism; and a balloon release mechanism which engages said balloon release valve, thereby releasing said balloon.

* * * * *